United States Patent Office 3,734,879
Patented May 22, 1973

3,734,879
METHYLOLATED AMINOPLAST MOLDING RESINS AND METHODS FOR PREPARING SAME
Joseph A. Vona, Westfield, Lawrence B. Holzman, West Orange, and James E. Tracy, Somerset, N.J., assignors to Celanese Corporation, New York, N.Y.
No Drawing. Filed Apr. 20, 1971, Ser. No. 135,750
Int. Cl. C08f 45/04
U.S. Cl. 260—37 N    14 Claims

ABSTRACT OF THE DISCLOSURE

Molding resins prepared from methylolated 2,7-dioxo-4,5-dimethyl - decahydropyrimido - [4,5-d]-pyrimidine having desirable physical and electrical properties, and processes for producing said molding resins, are disclosed.

BACKGROUND OF THE INVENTION

The market for thermoset molding resins is very significant and the annual increase in demand for these resins is equally significant. While at present, phenolics are the front-runners in total sales, certain of their physical and electrical properties leave much to be desired; of the electrical properties for example, dielectric constant and dissipation factor are typical. Among well-known commercial thermoset molding resins, melamine exhibits electrical properties quite superior to those possessed by phenolics. Unfortunately, however, melamine resins are somewhat more expensive.

Therefore, it is an object of the present invention to provide a reasonably-priced thermoset molding resin having good electrical properties.

Another object is to provide processes for producing a reasonably priced thermoset molding resin having good electrical properties.

These and other objects of the present invention, as well as a fuller understanding of the advantages thereof, can be had by reference to the following detailed description and claims.

DETAILED DESCRIPTION OF THE INVENTION

According to the present invention novel thermoset molding resins have been found which are readily prepared and which have very desirable electrical properties. In fact, the electrical properties exhibited by the novel resins herein contemplated are superior, as suggested hereinbefore, to those of the present most popular thermoset resins, viz., the so-called phenolics.

The thermoset resins contemplated herein are prepared from methylolated 2,7 - dioxo - 4,5 - dimethyl-decahydropyrimido-[4,5-d]-pyrimidine, as represented by the following Formula B:

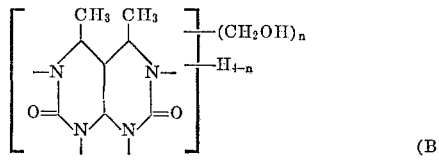

(B)

wherein $n$ is an integer from 1 to 4, inclusive. These compounds (B), above, are prepared, in turn, from 2,7-dioxo - 4,5 - dimethyldecahydropyrimido - [4,5-d]-pyrimidine having the Formula A:

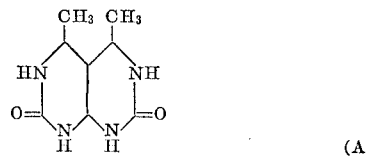

(A)

by reacting the latter compound (A) with controlled amounts of formaldehyde. Useful products are obtained at molar ratios of compound (A) to formaldehyde as low as about 1 to 0.8. However, ratios as high as to 1 to 10 may also be used. By judicious selection of the proper molar ratios, resins of high or low degrees of methylolation can be obtained. Since physical and electrical properties depend to a large degree on the amount of methylolation, this flexibility allows one to tailor-make resins to suit specific applications.

The compound 2,7-dioxo-4,5-dimethyl-decahydropyrimido-[4,5-d]-pyrimidine, (A), is reported in 92 Monatschefte fur Chemie 31 (1961) as a crystalline solid melting at 277° C. This material can be prepared by the acid-catalysed reaction between acetaldehyde and urea in an aqueous menstruum. The ratio of the concentration of acetaldehyde to that of urea in the reaction system is at least about 1.5 and preferably between about 1.8 and about 2.2. The reaction is desirably conducted at atmospheric pressure and at an elevated temperature, preferably at a temperature of between about 50° C. and about 100° C., with the atmospheric reflux temperature of the reaction system being especially preferred.

The compound 2,7-dioxo-4,5-dimethyl-decahydropyrimido-[4,5-d]-pyrimidine, (A), suitable for use in the present invention is conveniently and preferably prepared according to the following procedure, it being understood, of course, that other methods of synthesis can be used without departing from the spirit of the invention. Thus, 5285 parts by weight (120 moles) of acetaldehyde are charged to a suitable conventional reaction vessel and cooled to below 20° C. Then a solution of 3600 parts by weight (60 moles) of urea and 645 parts by weight of reagent grade sulfuric acid (98 percent) in 4275 parts by weight of water are added dropwise with stirring to the acetaldehyde. During the addition, a suitable cooling means (e.g., an ice-bath) is applied to the reaction vessel, and the rate of addition is adjusted, if necessary, in order to maintain the reaction system at a temperature of about 20° C. When the addition is complete, the reaction mixture is heated to atmospheric reflux temperature and maintained at that temperature for 1 hour. Thereafter, the reaction mixture is cooled to ambient temperature, diluted with water, and filtered to isolate the crystalline product, (A). The product is washed with water, then with methanol, and finally recrystallized from water. After drying the recrystallized product at 70° C., it weighs 1467 parts (25% of the theoretical yield based on urea) and melts at 275–280° C. Elemental analysis of the product corresponds to the formula $C_8H_{14}N_4O_2$.

The reaction of 2,7-dioxo-4,5-dimethyl-decahydropyrimido-[4,5-d]-pyrimidine, (A), with formaldehyde to produce the novel aminoplast material of the present invention is accomplished by contacting (A) with between about 2.80 and about 5.0 molar equivalents of formaldehyde in a hydroxylic medium. The hydroxylic solvent used should be capable of being separated from the resulting product (B) by evaporative means. The preferred solvent is water. The total concentration of the reactants in the hydroxylic medium is not critical.

In especially preferred processes, reaction is conducted using formalin, i.e., an aqueous solution of formaldehyde in which the concentration of formaldehyde is between about 35 and about 40 percent, or paraformaldehyde, an oligomer, as the HCHO source.

The reaction between reactant (A) and formaldehyde is catalysed by acid or base. Reaction can also be carried out without added catalyst. While the natural acidity of formalin, for example, is sufficient, reaction times are much longer. In effect, also acidic pH's are created during the reaction by conversion of some of the $CH_2O$ to formic acid. In aqueous media, the reaction can be conducted at a pH of less than or greater than 7. Good results are achieved, for instance, at pH greater than about 8 and less than about 12, say between about 9 and about 10.

The methylolation reaction contemplated herein proceeds well using a broad range of temperatures. For example, good results can be achieved at temperatures from about 35° C. to reflux, at atmospheric pressures. Elevated pressures, of course would require higher temperatures; conversely, subatmospheric pressures would necessitate proportionately lower temperature.

Molding resins of the type contemplated herein suitable for fabricating molded products are best prepared by blending the above-described methylolated 2,7-dioxo-4,5 - dimethyl-decahydropyrimido - [4,5-d] - pyrimidine resins (B) with a filler and a acidic curing catalyst. Typically, an aqueous mixture of (B) is thoroughly blended with (1) an inert filler, e.g., asbestos, glass, cellulose, wood flower, nutshell flower, silica, mica, a mixture of these, and the like, particulated or fibrous in shape and (2) an acidic curing catalyst. The resulting blend is then thoroughly dried and, if desired, further mixed or milled to uniform consistency before being molded in conventional ways, such as compression molding.

Acid curing catalysts of the type herein contemplated are the water-soluble organic and inorganic acids or inorganic acids salts which behave as so-called latent acid catalysts, e.g., ammonium chloride, magnesium chloride, zinc nitrate, and the like. Other acids which may be used as curing agents are Lewis acids, para-toluene sulfonic acid, acetic acid, formic acid, phosphoric acid, sulfuric acid, and the like organic and inorganic acid curing catalysts.

The concentration of curing catalyst may vary significantly from about 1 to about 50 percent, preferably from about 2 to about 15 percent, by weight based on the amount of aminoplast (B) used in the filler/resin molding resin mixture.

The filler/aminoplast ratio (by weight) may range from about 0.4/1 to about 3.5/1, preferably about 0.75/1 to about 2.0/1 depending on the end use intended for the molding resin and the physical properties desired.

Molding resin curing temperatures may vary considerably depending upon the type of molding equipment used, the filler resin concentration, etc. Typical molding conditions are:

| Molding process | Temp., °F. (range) | Pressure, p.s.i. (range) | Remarks |
|---|---|---|---|
| Compression | 300-375 | 2,000-6,000 | Pre-heat 30 seconds or less in radio frequency pre-heater. |
| Transfer | 300-375 | 2,000-6,000 | Preheat at 275° F. |
| Injection: | | | |
| Nozzle | 180-240 | 14,000-16,000 | |
| Mold | 340-380 | | |

It has been found that the addition of a small amount of unmethylolated 2,7 - dioxo - 4,5 - dimethyl-decahydropyrimido - [4,5-d] - pyrimidine, say from 3 to 18 percent by weight based on the methylolated aminoplast material, (B), to the molding resin prior to molding enhances curing properties.

Hereinabove described are monomeric resins of methylolated 2,7 - dioxo - 4,5 - dimethyl-decahydropyrimido-[4,5-d]-pyrimidine which, as will be seen hereinafter, are very useful for preparing the novel molding resins of the present invention. Polymeric derivatives of the monomeric resins may similarly be used to provide molding resins of the type contemplated herein. In situ polymerization of the aminoplast resins (B) may be accomplished in the preparation of (B) by adding additional amounts of acidic catalysts to maintain the pH at a level of about 3.0 to about 5.0 and continuing the reaction at reflux for extended periods of time until the desired viscosity is attained. Alternatively, polymerization may be attained at lower temperatures, say between about 30° C. and about 60° C., by maintaining lower pH values, e.g., between about 1.5 and about 2.5, for extended periods of time. Of course, these temperature ranges are modified proportionately if super-atmospheric or subatmospheric pressures are used. Generally, polymerization to relatively high viscosity is effected within about 6 hours at the higher temperatures and within about 12 to about 16 hours at the lower temperatures.

For best results, the polymeric resin is blended and cured under essentially the same conditions and concentrations described above and hereinafter for monomeric resins of compound (B).

DESCRIPTION OF PREFERRED EMBODIMENTS

The following examples are provided for the purpose of illustrating (but not limiting) the present invention. It is understood, of course, that changes and variations in the following procedures can be made without departing from the spirit of the invention and the scope thereof as defined by the appended claims.

In the following examples, parts and percentages are by weight unless otherwise indicated.

Example I

To a reaction flask is charged 715 grams of formalin (37% "uninhibited"). To this is added 1740 grams of 2,7 - dioxo - 4,5 - dimethyl-decahydropyrimido - [4,5-d]-pyrimidine(A) with stirring, thus providing a reactant (A): HCHO molar ratio of 1:1. Good stirring is provided by the simultaneous addition of water, 800 grams thereof being needed. The resulting mixture, a thick white paste, has a temperature of 25° C. Heat is applied such that the mixture reaches 85° C. in 15 minutes and 102° C. (reflux) after a total of 25 minutes. The temperature is maintained at reflux for about 5¾ hours, after which the reaction mixture is cooled to room temperature and filtered to remove undissolved solids.

On standing for several days, the filtrate containing product methylolated 2,7-dioxo-4,5-dimethyl-decahydropyrimido-[4,5-d]-pyrimidine, (B), pastes out, has a pH of 8.2, and contains 50.0 solids.

Example II

The product of Example I is formulated into a molding resin using (a) as curing catalyst 10 grams (solids) of para-toluene-sulfonic acid, as an aqueous 20% (solids) solution; (b) 250 grams of particulate asbestos; (c) 339 grams of the aqueous product of Example I containing 200 grams (59%) of resin product solids and (d) 20 grams of unmethylolated 2,7 - dioxo - 4,5 - dimethyl-decahydro-pyrimido-[4,5-d]-pyrimidine. Components (a), (c) and (d) are added to (b), thoroughly blended, and the resulting mixture dried for several days in a vacuum oven at 50° C. After drying, the materials are ground to fine particles using a Wiley mill, i.e., a revolving blade mill.

Two plaques are made for electrical testing. Each measures 3 inches wide, 3 inches long, and about 66 millimeters in thickness. The plaques are molded using a conventional hydraulic molding press at 180° C., 30 tons pressure and 2 minute cycles, breathing about 1–2 times during the cycles. The following tables show the electrical properties of the plaques:

TABLE I

| Sample | Thickness, millimeters | Dielectric constant, frequency (Hz) | | | | |
|---|---|---|---|---|---|---|
| | | 100 | 1K | 10K | 100K | 1M |
| Plaque of Example II | 66.0 | 26.0 | 16.8 | 11.3 | 6.9 | 5.3 |
| | | Dissipation factor, frequency (Hz) | | | | |
| Do | 66.0 | .25 | .32 | .34 | .23 | .008 |

By way of comparison, published figures for the electrical properties of commercially popular phenolic and melamine resins are:

TABLE II

| Sample | Dielectric constant, frequency (Hz.) | | |
|---|---|---|---|
| | 60 | 1K | 1M |
| Phenolic molding compounds:[1] | | | |
| General purpose | 5.0-6.0 | 5.2-6.2 | 4.6-5.1 |
| Electrical grade | 5 2-10.0 | 4.9-7.5 | 4.6-5.0 |
| | Dissipation factor, frequency (Hz.) | | |
| General purpose | 0.05-0.15 | 0.04-0.07 | 0.03-0.04 |
| Electrical grade | 0.03-0.14 | 0.25-0.14 | .013-0.05 |

[1] With commercial filler.

NOTES:
Determined in accordance with ASTM D-150.
Source: "Pyrene Phenol Formaldehyde Resin" Plasticheskie Massy, No. 9, pp. 19-21 (1967).

TABLE III

| | Dielectric constant, frequency (Hz.) | |
|---|---|---|
| | 60 | 1M |
| Melamine molding compounds: | | |
| Unfilled | 7.9-11 | 6.3-7.3 |
| Electrical grade, cellulose filled | 6.2-7.7 | 5.2-6.0 |
| Electrical grade, mineral filled | 10.0-10.2 | 5.3-6.7 |
| | Dissipation factor, frequency (Hz.) | |
| Unfilled | 0.048-0.162 | 0.1-0.040 |
| Electrical grade, cellulose filled | 0.026-0.192 | 0.032-0.12 |
| Electrical grade, mineral filled | 0.07-0.17 | 0.03-0.05 |

Source: Materials Selector, mid-October, 1967.

TABLE IV

| | Dielectric constant, frequency (Hz.) | | |
|---|---|---|---|
| | 60 | 1K | 1M |
| Phenol-formaldehyde and phenol-furfural molding compounds: | | | |
| Asbestos filler | 5.0-20.0 | 6.0-16.0 | 5.0-10.0 |
| | Dissipation factor, frequency (Hz.) | | |
| Do | 0.05-0.20 | 0.05-0.20 | 0.35-0.80 |
| | Dielectric constant, frequency (Hz.) | | |
| Melamine-formaldehyde molding compounds: | | | |
| Asbestos filler | 6.4-10.2 | 9.0 | 6.1-6.7 |
| | Dissipation factor, frequency (Hz.) | | |
| Do | 0.07-0.17 | 0.07 | 0.041-0.050 |

Source: 1970-1971 Modern Plastics Encyclopedia.

Other methods for preparing the methylolated 2,7-dioxo-4,5-dimethyl-decahydropyrimido-[4,5-d]-pyrimidine products useful for making the molding resins of the present invention are taught in the following two (2) examples:

Example III

To a suitable reaction vessel equipped with conventional agitation means are charged 239 grams (2.94 moles) of 37 percent Formalin ("uninhibited") and 15 grams of a 10 percent aqueous solution of sodium carbonate. To the resulting mixture is added, with agitation 198 grams (1.0 mole) of crystalline 2,7-dioxo-4,5-dimethyl-decahydropyrimido-[4,5-d]-pyrimidine. The reaction mixture which has a pH of between about 9 and about 9.5, is heated to reflux temperature over the course of about 20 minutes and maintained at the reflux temperature for about 5 minutes. The reaction mixture is then cooled to ambient temperature, the pH is adjusted to 7.0, and the reaction mixture filtered to remove insolubles. The clear filtrate contains 2.5 percent free formaldehyde as determined by the "sodium sulfite method" described in Walker, Formaldehyde, 3d ed., p. 486 (Reinhold, N.Y., 1964). The concentration of aminoplast material (B), in the aqueous filtrate is 60 percent by weight as determined gravimetrically, i.e., by evaporating an aliquot sample of the solution at 70° C. for 6 hours and weighing the residue.

Example IV

This example illustrates variant of the procedure used in Example III, above, to produce aminoplast material (B).

To a suitable reaction vessel equipped with conventional agitation means are charged 2099 grams (36 moles) of 37 percent formalin ("uninhibited") and 135 grams of a 10 percent aqueous solution of sodium carbonate. To the resulting mixture is added, with agitation, 1782 grams (9 moles) of crystalline 2,7-dioxo-4,5-dimethyl-decahydropyrimido-[4,5-d]-pyrimidine (A). The reaction mixture is then heated at reflux temperature for 5 minutes and cooled to ambient temperature. An additional charge of 135 grams of 10 percent aqueous sodium carbonate and 990 grams (5 moles) of reactants (A), are added and the reaction mixture is again heated to reflux temperature and maintained thereat for 30 minutes. Upon recooling the reaction mixture to ambient temperature, neutralizing the pH, and filtering, a solution of aminoplast material, (B), is obtained which contains 2.0 percent unreacted formaldehyde.

Example V

Polymeric methylolated 2,7-dioxo-4,5-dimethyldecahydropyrimido-[4,5-d]-pyrimidine is prepared following essentially the process of Example I, above, with the following exceptions:

Formulation N                                   Grams
(1) Reactant (A) _____ 398
(2) Formalin (37% "uninhibited") _____ 486
(3) H$_2$O _____ 100
    [(A) :HCHO molar ratio=1:3]

| Time | Temp., °C. | Remarks |
|---|---|---|
| 9:00 | [1] | Charge 1, 2 and 3 to reactor and heat to reflux. |
| 9:40 | 99 | Refluxing; white paste. |
| 10:10 | 101 | Refluxing; pH 4.7; clear; add aqueous formic acid (HOH/FA) to pH 4.0. |
| 10:40 | 100 | Refluxing; pH 4.6; add HOH/FA to pH 4.1. |
| 11:10 | 100.5 | Refluxing; pH 4.7; add HOH/FA to pH 4.1. |
| 11:40 | 101 | Refluxing; pH 4.3; add HOH/FA to pH 4.1. |
| 12:40 | 101 | Refluxing; 5.8; add HOH/FA to pH 4.2. |
| 1:40 | 101 | Refluxing; pH 5.6; add HOH/FA to pH 4.1. |
| 2:40 | 101 | Refluxing; pH 5.6; add HOH/FA to pH 4.2. |
| 3:40 | 101 | Refluxing; pH 5.8; add HOH/FA to pH 4.2. |
| 4:55 | 101 | Refluxing; pH 5.8; add triethanolamine (100% to pH 7.2; drop heat and cool. |

[1] Room temperature.

The resulting product, polymeric methylolated 2,7-dioxo-4,5-dimethyl-decahydropyrimido-[4,5-d] - pyrimidine, 55.3 solids, has a viscosity of 1030 cps., is clear and has a medium yellow color.

This product, as indicated hereinbefore, is blended and cured essentially as in Example II, above, to produce molding resin particulates of the type described in Example II and having similar properties.

We claim:

1. A molding composition having good molding properties and electrical properties, comprising a methylolated 2,7-dioxo - 4,5 - dimethyl-decahydropyrimido-[4,5-d]-pyrimidine, as a resin component, a filler and a curing catalyst effective to polymerize, cross-link and cure said methylolated compound.

2. The molding composition of claim 1 wherein the filler/resin ratio is in the range of about 0.4/1 to about 3.5/1.

3. The molding composition of claim 2 wherein the filler/resin ratio is in the range of about 0.75/1 to about 2.0/1.

4. The molding composition of claim 1 wherein the catalyst is an acid curing catalyst.

5. The molding composition of claim 4 wherein the filler is particulated asbestos and the curing catalyst is para-toluene sulfonic acid.

6. The molding composition of claim 1 containing additionally minor amount of 2,7-dioxo-4,5-dimethyl-decahydropyrimido-[4,5-d]-pyrimidine.

7. A method which comprises blending methylolated 2,7-dioxo - 4,5 - dimethyl-decahydropyrimido-[4,5-d]-pyrimidine, a filler and a curing catalyst effective to polymerize, cross-link and cure said methylolated compound in an aqueous medium, drying the mixture, and recovering the resulting molding composition.

8. The method of claim 7 wherein the filler/resin ratio is in the range of about 0.4/1 to about 3.5/1.

9. The method of claim 8 wherein the filler/resin ratio is in the range of about 0.75/1 to about 2.0/1.

10. The method of claim 9 wherein the catalyst is an acid curing catalyst.

11. The method of claim 10 wherein the filler is particulated asbestos and the curing catalyst is para-toluene sulfonic acid.

12. The method of claim 7 wherein a minor amount of 2,7-dioxo - 4,5 - dimethyl-decahydropyrimido-[4,5-d]-pyrimidine is present in the mixture to enhance molding.

13. The molding composition of claim 1 wherein the methylolated 2,7-dioxo-4,5-dimethyl-decahydropyrimido-[4,5-d]-pyrimidine has the formula:

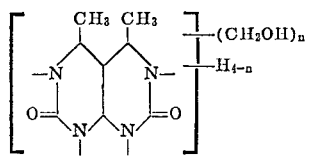

wherein $n$ is an integer from 1 to 4, inclusive.

14. The molding composition of claim 13 wherein a minor amount of 2,7-dioxo-4,5-dimethyl-decahydropyrimido-[4,5-d]-pyrimidine is also present.

References Cited
UNITED STATES PATENTS

| | | | |
|---|---|---|---|
| 2,949,466 | 8/1960 | Hoefle et al. | 260—256.4 |
| 3,055,900 | 9/1962 | Druey | 260—256.4 |
| 3,242,173 | 4/1966 | Ohnacke | 260—246 |

MORRIS LIEBMAN, Primary Examiner

R. ZAITLEN, Assistant Examiner

U.S. Cl. X.R.

260—67.6 C, 39 R